United States Patent [19]

Gardner

[11] 4,107,369

[45] Aug. 15, 1978

[54] FABRIC HAVING AN ELASTOMER COAT ON FACE AND METHOD OF PRODUCING SAME

[75] Inventor: Eric Richard Gardner, Bath, England

[73] Assignee: Avon Rubber Company Limited, Melksham, England

[21] Appl. No.: 725,450

[22] Filed: Sep. 22, 1976

[51] Int. Cl.² ............................................... B32B 7/00
[52] U.S. Cl. .................................... 428/246; 28/166; 28/219; 156/148; 156/161; 156/229; 156/309; 728/252
[58] Field of Search ............ 428/910, 250, 252, 253, 428/316, 322, 246, 265, 229, 230, 231; 139/420 R, 426 R, 291 R; 156/160, 161, 163, 164, 229, 148, 309; 28/166, 219

[56] References Cited

U.S. PATENT DOCUMENTS

| | | | |
|---|---|---|---|
| 2,485,725 | 10/1949 | Francis | 428/231 |
| 2,533,976 | 12/1950 | Teague | 428/253 |
| 3,028,279 | 4/1962 | Heberlein | 156/160 |
| 3,086,274 | 4/1963 | Arnett | 28/156 |
| 3,395,744 | 8/1968 | Wolf et al. | 152/358 |
| 3,440,133 | 4/1969 | Burnett | 428/253 |
| 3,514,365 | 5/1970 | Burnett et al. | 428/253 |
| 3,576,703 | 4/1971 | Baker et al. | 428/253 |
| 3,814,658 | 6/1974 | Decker | 428/252 |
| 4,060,999 | 12/1977 | Marks et al. | 28/166 |

*Primary Examiner*—James J. Bell
*Attorney, Agent, or Firm*—Pennie & Edmonds

[57] ABSTRACT

A fabric having an elastomer coat on each face of a woven layer and having resistance to water attack along the woven layer is formed by heating and stretching the yarn, the thread or the fabric of the woven layer, for example to achieve 20 to 30% elongation, so as to reduce or eliminate interfilamentary spaces and subsequently coating the woven layer. The fabric is of particular value for gas-cushion vehicles intended for travel over water.

20 Claims, 4 Drawing Figures

FABRIC HAVING AN ELASTOMER COAT ON FACE AND METHOD OF PRODUCING SAME

FIELD OF THE INVENTION

This invention relates to coated fabric.

BACKGROUND OF THE INVENTION

A problem which occurs in some applications of coated woven fabric is loss of adhesion between the coating and the woven layer due to water. This problem occurs not so much in applications like vehicle tyres as in applications where the coated fabric is to be in considerable contact with water and where there may be access for water to an exposed area of the coated fabric. One particular application in which this problem occurs is in the skirts of gas cushion vehicles which are to travel over water. At least in the United Kingdom gas cushion vehicles which are self-propelled are popularly known as "hovercraft" and this term will be used, for convenience, in the remainder of this specification.

The skirt system of a hovercraft consists basically of a loop or of a bag to which are attached segments or fingers (hereinafter referred to as "fingers") which actually contact the ground or water over which the hovercraft travels. The fingers deteriorate more rapidly than the loop or bag. In the case of hovercraft which travel over land most of the deterioration is due to abrasive wear resulting from contact with the ground. For hovercraft which travel wholly or mainly over water the reasons for deterioration are more complex. Wear can take place due to contact with water and to mutual contact and rubbing between areas of the finger. However a failure typical of hovercraft travelling over water is associated with the breakdown of adhesion between the rubber and fabric in the lower parts of the fingers. This is due to the very severe flexing to which the material is subjected.

The coated material which is used for the manufacture of the skirt system components is generally composed of a base fabric of nylon treated with an adhesive and then coated with a natural or synthetic rubber compound. The adhesive is generally a resorcinol-formaldehyde-polymer composition deposited from an aqueous mixture of resorcinol, formaldehyde and a type or types of polymer latex compatible with the natural or synthetic rubber compound which is afterwards applied. Alternatively a solvent-based cement of a polymer composition into which an organic polyisocyanate solution is stirred may be used for treating the fabric and in this case the dried adhesive film consists of an intimate mixture of the polymer and a polyisocyanate. After coating the natural or synthetic rubber compound is vulcanised or cross linked by methods well known in the polymer industry, unless it is thermoplastic when it would be subjected to a heat treatment.

The breakdown in the adhesion between the natural or synthetic rubber compound and fabric in the case of hovercraft travelling over water is due to the flexing to which the material is subjected, as has already been stated. However the breakdown is accelerated by the weakening of the adhesive due to the diffusion or permeation of water into the adhesive layer.

SUMMARY OF THE INVENTION

We have now discovered that the penetration of water to the adhesive layer is at least in part due to the capillary action of the components of the woven layer itself as a result of which water travels into or along the threads which are used for weaving the fabric. The extent of this penetration is determined by the surface tension of the water relative to the textile material used and to the cross-sectional area of the spaces between the filaments making up the yarn and (to a lesser extent) between the yarns making up the thread. Each yarn consists of a plurality of filaments. The twisted yarn or yarns are what make up the thread, and the threads are the warp and weft of the woven fabric.

The invention resides in reducing or eliminating interfilamentary spaces in the yarns or threads by softening the material or which they are made and tensioning them.

There exists in the prior art the general practice of "heat stabilization" of thermoplastic woven fabrics. In order to relieve stresses occurring as a result of spinning or other fabrication steps and prevent later and unwanted shrinkages or distortions of the fabric, the fabric is held under tension at an elevated temperature. That treatment is essentially carried out at a temperature where there will be no appreciable softening of the material of the fabric, and the maximum tolerable stretch is of the order of 2%. There is no intention in that process of reducing interfilamentary spaces and there is in fact no appreciable such reduction. Distortion of the filaments or consolidation of the yarn is avoided since it would affect the "feel" of the fabric.

In contrast, in the present invention, the yarn or thread is treated, before or after weaving, by applying heat treatment to a thermoplastic thread, yarn or fabric to soften the thread or yarn and tensioning the thread or yarn so as to distort the filaments making it up to reduce its interfilamentary spaces. Then an elastomer layer is adhered to each face of the fabric. A yarn or thread or woven fabric of thermoplastic textile material is stretched under tension (or in the case of a heat shrinking material its length is maintained) at a temperature at which the filaments in the yarns, or if a thread or fabric is treated, preferably also the yarns in the thread, compact together.

In another aspect of the invention we provide a coated fabric having a woven layer to each face of which an elastomer layer is adhered, the woven layer consisting of a fabric of a thermoplastic thread or yarn showing misshaping of the filaments making up the thread or yarn evidencing tensioning under heat treatment to which the thread, yarn or fabric had been subjected.

The invention comprehends also a gas cushion vehicle having a skirt including such a coated fabric.

DESCRIPTIONS OF PREFERRED EMBODIMENTS

Figure 1:
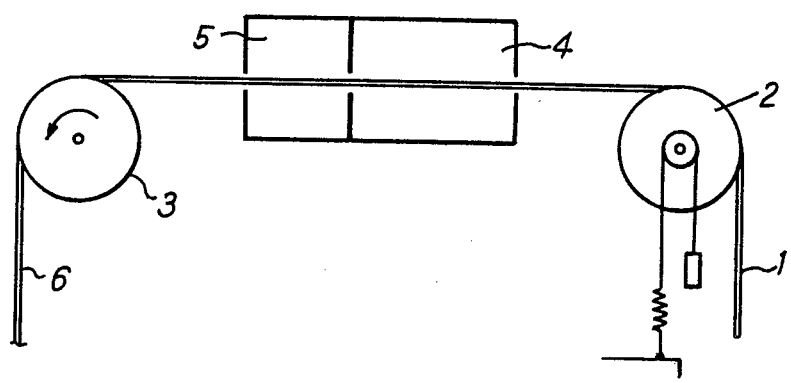
FIG. 1 is a diagrammatic representation of one method of tensioning a yarn of thread.

One way of carrying out heat treatment on a yarn or thread is illustrated in FIG. 1.

Yarn 1 (the method may equally well be applied to a thread) is fed from a supply over a braked feed pulley 2 to a draw pulley 3 which is driven so that tension is exerted on the run of thread or yarn between the two pulleys. During that run the yarn passes through first a heating chamber 4 which is at an appropriate temperature to cause softening of the material of the yarn so that the yarn is stretched longitudinally within this chamber. It is then cooled in chamber 5 so that it is rehardened. The treated yarn 6 is then taken to a storage spool or bobbin.

Figure 2:
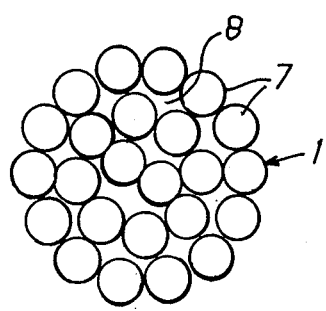
FIG. 2 is a cross section of a yarn before treatment.

Yarn before treatment is seen in FIG. 2, the filaments 7 being round in cross section and having appreciable and continuous interfilamentary spaces 8.

Figure 3:
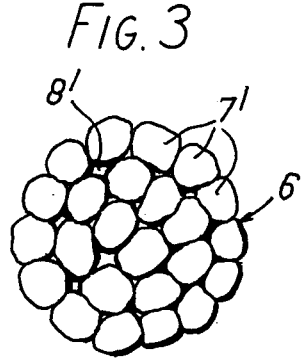
FIG. 3 is a cross section of the same yarn after treatment, showing distortion of its filaments and reduction of its interfilamentary spaces.

After treatment the yarn has the appearance diagrammatically shown by FIG. 3. The yarn having been stretched, its diameter has diminished slightly. The filaments 7' have been distorted from their previous round section to irregular sections so that they generally conform to the outer surface of a next adjacent filament. Interfilamentary spaces 8' are much reduced and in some cases have disappeared altogether.

Figure 4:
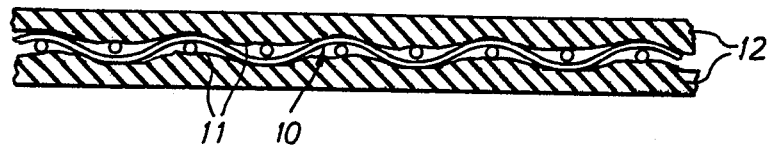
FIG. 4 is a woven fabric of reduced interfilamentary space having rubber layers calendered to each face by means of an adhesive layer.

A coated fabric made up from a treated yarn, thread or woven fabric is seen diagrammatically in FIG. 4. The woven fabric 10 of reduced interfilamentary space has an adhesive layer 11 conforming to both its faces. Rubber layers 12 are calendered to each face.

The general consideration governing the carrying out of the invention in any specific case will now be discussed more fully.

The coating is conveniently carried out using a polyester fabric of for example, Terylene (RTM), Dacron (RTM), Terlenka (RTM), or Trevira (RTM); or a fabric of Nylon 6 or 66, woven from threads which have been heat treated under tension at a temperature at which the threads and yarns have softened. It is preferred that these are double yarns (to be used in both warp and weft of a final fabric) with a high twist i.e. > 250 turns/meter.

A preferred degree of actual extension is such that the finished length is 5%, and more preferably at least 10% more than the starting length of the yarn, thread or fabric. In the case of thermo-shrinking materials this stretch is preferably additional to that achieved by resisting or overcoming the tendency of that material to shrink upon heating.

Examples are:
  a polyester thread of construction 1100 d tex/2 with a twist of 470 × 470 turns per meter and heat treated at a temperature of 235° C and tension is applied to stretch it by 20%.
  a nylon 6 thread of construction 940 d tex/2 twist 470 × 470 turns per meter, is heated at 225° C under a tension of 2,250 grams to stretch it by 30%.
  a nylon 66 thread of construction 940 d tex/2 is stretched 30% at 235° C.

The invention is not restricted to threads of doubled construction or to threads with high twist. Single yarn threads may be used and also high twist need not be employed, although some twist is necessary. Any suitable material which is thermoplastic may be used. The heat treatment should be carried out as near as possible to the softening or melting point to allow the filaments to flow in order to reduce the interfilamentary spaces. The tension may be applied extrinsically, as above, or by holding thread or yarn of a heat-shrinking material to length, or by increasing the length of a heat-shrinking material (which would otherwise if unrestrained have shrunk by perhaps 5%. When the cross-section of a heat treated thread or yarn is examined, the filaments appear to be a little misshapen and the spaces between the filaments reduced but not all of them are eliminated. In spite of the fact that many spaces are still visible the treatment is effective in hindering or preventing capillary action. This is believed to be due to the fact that the spaces between the filaments follow a spiral configuration in the twisted yarn and after the heat-treatment spaces which are open in one particular transverse cross-section may have disappeared (i.e. have dried up) in an adjacent cross section. The fabric is then coated with a conventional adhesive and then elastomer layers are applied with calendering to force air from between the elastomer layer and the fabric as the calender roll progresses along the length of the web or sheet being formed.

This method is best applied to the yarns or threads before weaving because if the fabric is heat treated, tension is normally applied in the warp and the weft is allowed to relax, or if a stenter is used the weft is held approximately to length. The desired plastic flow would take place more effectively in the warp than in the weft and in fact if a stenter is not used then no plastic flow would occur in the weft. Thus a fabric treated in this way could only be used to give the advantages available because of the invention if the water-contacting components are manufactured so that the warp threads will be approximately at 90° to the water surface when in position on the hovercraft. However, if a fabric is used in which the main strength is in the warp direction, at least two coated plies adhered together would be necessary. In this case there may be any convenient angle between the warp threads or yarns in the various plies and the angle between the threads or yarns and the surface of the water is not critical because if the treatment has been carried out correctly there should be no penetration of water by capillary action into any of the warp threads or yarns.

Subject to the proviso mentioned above about maintaining a certain directionality in some cases, the coated fabric is then made up in a conventional manner for its intended use in or as, for example a hovercraft skirt.

I claim:

1. The method of treating thermoplastic yarn having a plurality of thermoplastic filaments to at least reduce the capillary attraction of the interfilament spaces comprising distorting the filaments by: heating the yarn to a temperature sufficient to soften the thermoplastic material of the filaments, tensioning the yarn while the thermoplastic material is softened by said heating, maintaining such heating and tensioning for a time sufficient to insure distortion of the filaments and at least reduction of the interfilamentary space; cooling the yarn to set the filaments in their distorted state to permanently reduce the interfilament spaces whereby the capillary attraction of said yarn is reduced or eliminated; making up said yarn into thread; weaving said thread into a fabric; and finally securing an elastomer to at least one face of the fabric.

2. A method according to claim 1 wherein the yarn is stretched at least 5%.

3. A method according to claim 1 wherein the yarn is stretched by at least 20%.

4. A method according to claim 2 which is carried out on a thread having a twist greater than 250 turns/meter, before weaving.

5. The method of claim 1 wherein the making up of said yarn into thread is performed after the cooling step.

6. The method of claim 1 wherein the making up of said yarn into thread is performed before the heating and tensioning steps whereby a thread of yarn is tensioned while heat softened.

7. The method of claim 1 wherein the making up of said yarn into thread and weaving said thread into a fabric is performed before the heating and tensioning steps whereby an entire fabric of yarn is tensioned while heat softened.

8. The method of claim 1 including securing said elastomer to said face with an adhesive.

9. The method of claim 1 including securing an elastomer to both faces of said fabric.

10. The method of claim 9 including securing said elastomer to said both faces with an adhesive.

11. The method of claim 6 wherein the weaving of said thread into a fabric is performed after the cooling step and before the securing step.

12. The method of claim 1 in which the thermoplastic material of the filaments is non-heat-shrinkable and in which the tension is produced by application of a force to stretch the yarn to a greater length.

13. The method of claim 1 in which the thermoplastic material of the filaments is heat-shrinkable and in which the tension is produced by applying a force to the yarn at least sufficient to prevent shrinkage of the yarn.

14. The method of claim 9 in which said cooling is carried out while the yarn is under tension.

15. The method of claim 10 in which said cooling is carried out while the yarn is under tension.

16. The method of claim 13 in which the force applied to the yarn is sufficient to increase its length.

17. A coated fabric comprising a woven fabric layer, an elastomeric layer on at least one face of said fabric layer, said fabric including a plurality of juxtaposed filaments, said filaments being thermoplastic, said filaments also being misshapen and the interfilament space being at least reduced evidencing that said filaments have undergone tensioning while heat softened.

18. The article of claim 17 in which said elastomeric layer is adhered by an adhesive to said at least one face.

19. The article of claim 17 in which said fabric layer has an elastomeric layer on both faces thereof.

20. The article of claim 19 in which said elastomeric layers are adhered by an adhesive to said faces.

* * * * *